(12) United States Patent
Chang et al.

(10) Patent No.: US 8,924,938 B2
(45) Date of Patent: Dec. 30, 2014

(54) SOFTWARE TESTING USING MACHINE LEARNING

(75) Inventors: Richard Chang, Austin, TX (US); Sriram Sankaranarayanan, Plainsboro, NJ (US); Guofei Jiang, Princeton, NJ (US); Franjo Ivancic, Jersey City, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 2035 days.

(21) Appl. No.: 11/863,387

(22) Filed: Sep. 28, 2007

(65) Prior Publication Data

US 2008/0082968 A1   Apr. 3, 2008

Related U.S. Application Data

(60) Provisional application No. 60/827,230, filed on Sep. 28, 2006.

(51) Int. Cl.
G06F 9/44 (2006.01)
G06F 11/36 (2006.01)

(52) U.S. Cl.
CPC .................. *G06F 11/3688* (2013.01)
USPC .......................... 717/128; 717/126

(58) Field of Classification Search
USPC ................................. 717/128, 126
See application file for complete search history.

(56) References Cited

U.S. PATENT DOCUMENTS

| | | | |
|---|---|---|---|
| 5,050,168 A * | 9/1991 | Paterson | 714/35 |
| 5,708,774 A | 1/1998 | Boden | |
| 6,088,690 A | 7/2000 | Gounares et al. | |
| 6,327,699 B1 * | 12/2001 | Larus et al. | 717/128 |
| 6,959,431 B1 * | 10/2005 | Shiels et al. | 717/124 |
| 2002/0133807 A1 * | 9/2002 | Sluiman | 717/124 |

OTHER PUBLICATIONS

Jiang et al. (Multi-resolution Abnormal Trace Detection Using Varied-length N-grams and Automata, Proceedings of Second International Conference on Autonomic Computing, 2005).*

Agrawal, R., and Srikant, R. Mining sequential patterns. In Proc. of the Intl Conference on Data Engineering (ICDE) (Taipei, Taiwan, Mar. 1995), pp. 3-14.

Bagnara, R., Ricci, E., Zaffanella, E., and Hill, P. M. Possibly not closed convex polyhedra and the Parma Polyhedra Library. In SAS (2002), vol. 2477 of LNCS, Springer-Verlag, pp. 213-229.

Barron, A., Rissanen, J., and Yu, B. The minimum description length principle in coding and modeling. IEEE Trans. on Information Theory 44, 6 (1998), pp. 2743-2760.

Biberstein, M., Farchi, E., and Ur, S. Fidgeting to the point of no return. In Proc of Intl. Parallel and Distributed Processing Symp. (IPDPS 2004 (2004); 8 pages.

F. Ivancic et al., F-soft: Software verification platform, CAV, 2005; pp. 301-306.

(Continued)

*Primary Examiner* — Hang Pan
(74) *Attorney, Agent, or Firm* — Joseph Kolodka (57) ABSTRACT

A system and method for analyzing a computer program includes performing a static analysis on a program to determine property correctness. Test cases are generated and conducted to provide test output data. Hypotheses about aspects of execution of the program are produced to classify paths for test cases to determine whether the test cases have been encountered or otherwise. In accordance with the hypothesis, new test cases are generated to cause the program to exercise behavior which is outside of the encountered test cases.

20 Claims, 5 Drawing Sheets

(56) References Cited

OTHER PUBLICATIONS

Jiang, G., Chen, H., Ungureanu, C., and Yoshihira, K. Multi-resolution abnormal trace detection using varied-length n-grams and automata. In ICAC (2005), IEEE Computer Society, 2005; pp. 111-122.

Mine, A. A new numerical abstract domain based on difference-bound matrices. In PADO II (May 2001), vol. 2053 of LNCS, Springer-Verlag,; 2001; pp. 155-172.

Nimmer, J. W., and Ernst, M. D. Static verification of dynamically detected program invariants: Integrating daikon and esc/java. Electr. Notes Theor. Comput. Sci. (2001) 55, 2; 22 pages.

Rugina, R., and Rinard, M. Symbolic bounds analysis of pointers, array indices, and accessed memory regions. In Proc. Programming Language Design and Implementation (PLDI'03) (2000), ACM Press; 14 pages.

Sankaranarayanan, S., Colon, M., Sipma, H. B., and Manna, Z. Efficient strongly relational polyhedral analysis. In VMCAI (2006), LNCS, Springer-Verlag, 2006; pp. 111-125.

Yang, J.. Evans, D., Bhardwaj, D., Bhat, T., and Das, M. Perracotta: Mining temporal api rules from imperfect traces. In Proceedings of Intl. Conf. on Software Engg. (ICSE 2006) (2006); pp. 1-10.

Yang, J., and Evans, D. Automatically discovering temporal properties for program verification, 2005. Technical Report, Department of Computer Science, University of Virginia; 2005; 22 pages.

\* cited by examiner

10

```
foo (int x, int *y) {
    switch (x) {
        case 0 :
            1 : clear(y, 1 );
               break;
            case 1 :
            2 : clear (y, 0);
               break;
            default :
    if (0≤ x ≤ 1024)
           3 : clear (y, x);
        else
                ERROR ( );
    }
}
```

```
clear (int *y, int n){
    for (i = 0; i <n; ++i )
    *(y + i ) = NULL;
}
main (int x, int* y, int n) {
    if (0 ≤ x ≤ n)
        1 : foo (x, y, );
    else
        2 : foo (n, y, );
}
```

SOFTWARE TESTING USING MACHINE LEARNING

RELATED APPLICATION INFORMATION

This application claims priority to provisional application Ser. No. 60/827,230 filed on Sep. 28, 2006, and incorporated herein by reference.

BACKGROUND

1. Technical Field

The present invention relates to software testing/verification and more particularly to systems and methods for testing software that employ testing with machine learning to debug programs.

2. Description of the Related Art

Bug finding approaches can be divided into two categories: dynamic and static techniques and combinations thereof. Dynamic testing and static analysis are commonly used bug finding techniques at the extreme ends of this spectrum, dynamic testing being the more commonly used. Testing is performed by running or simulating the system under many user-provided test cases, which define program inputs and the runtime environment. Static analysis uses symbolic reasoning techniques to find bugs in software. Both techniques can be performed in numerous ways based on the program under test and the testing requirements. For example, unit testing/local static analysis is used to verify and sometimes derive contracts at function interfaces whereas global testing and analysis aim to analyze the entire program as a whole to identify bugs.

Testing begins with the specification of test cases and the runtime environment, and aims to find bugs by executing the program. Test case generation is a well studied problem for different types of systems with a host of techniques ranging from the informal to the formal. The main advantage of testing is the reliability of the test information especially when the testing is performed for the entire program. In practice, however, achieving an acceptable coverage for large software systems is prohibitive.

As a result, testing is rarely applied exhaustively except for safety critical software. To complicate matters, the notion of coverage is not well defined and at times the correlation between a particular notion of coverage such as line coverage and the number of unexplored bugs is weak. Static Analysis uses reasoning techniques to deduce the presence of bugs or prove their absence. In theory, static analysis techniques are sound and exhaustive, i.e., they guarantee 100% coverage of the program paths and input values.

In practice, soundness and exhaustive searches are sacrificed for scalability. Nevertheless, the success of the many popular static analysis tools such as CoVerity™, FindBugs™, PreFix™, PolySpace™ and so on are mainly due to their independence from an actual running environment and vastly improved code coverage. One key disadvantage is the intractability of static analysis techniques and the high false positive rates.

SUMMARY

Many bugs in programs are encountered while handling anomalous or rarely encountered situations. A bug finding method and system in accordance with the present principles are based on a combination of test case generation using static analysis, testing and learning useful facts from the test data. One approach places these two components in a feedback loop by using the result of machine learning to guide static test generation and thereafter, learning different aspects of a program behavior. The iteration of these two techniques is shown to isolate "rare" behaviors of a program. Furthermore, an application of the framework is demonstrated for finding buffer overflows and null pointer violations in sequential C programs, for example.

A system and method for analyzing a computer program includes performing a static analysis on a program to determine property correctness. Test cases are generated and conducted to provide test output data. Hypotheses about aspects of execution of the program are produced to classify paths for test cases to determine whether the test cases have been encountered or otherwise. In accordance with the hypothesis, new test cases are generated to cause the program to exercise behavior which is outside of the encountered test cases.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments in accordance with the present principles provide an approach to bug finding using directed test generation based on learning properties from an output. At each iteration, the tests from the previous iterations are run and different aspects of the test output are fed to learning modules to learn general properties of the test outputs so far. These aspects may include function call sequences from which we may learn an automaton characterizing the function calls in test data, or variable values at a specific point in the program from which we may learn likely program invariants.

The properties thus learned are fed into a test generation module that statically searches for program paths violating the properties asserted by the learner. The test generation then searches for appropriate inputs that exercise some of the violating paths. The tests from these paths are executed and their outputs added to the testing data pool. Each iteration uses the learner as a guide to explore new paths that were not explored in the previous iterations. As a result, the coverage of the tests is enhanced, increasing the possibility of finding bugs.

The present techniques use a lightweight static analysis tool that uses program abstraction and symbolic execution to perform test generation and uses a simulator to execute the test cases generated. An advantage of this technique is that it uses static reasoning in a goal directed fashion to increase coverage and help find bugs. The learning used in the framework directs the test case generation by capturing the essence of what has been observed so far in the testing process. As a result, the learning and the test case generator work in a feedback loop that isolates behaviors that may not surface otherwise in other approaches to testing. Bugs are found by running tests. As a result, the abstraction used in the present test case generation does not lead to false bugs.

Data from testing has been used to infer invariants, learn software specifications or to perform an abstract execution. These invariants have been used in a static analysis framework to prove program properties. Commonly generated invariants include linear equalities among the variables in the program and properties of data structures such as linked lists.

Facts learned from test output have been used as formal specifications. Common function call sequences can be inferred from the test data. These sequences are used as specifications for a static analyzer such as ESP to discover anomalous call sequences. However, the resulting automata in this approach is simply used to monitor the program and flag deviations.

The present embodiments, learns facts such as likely invariants and commonly occurring call sequences. However, rather than use these facts as likely invariants or as formal specifications, they are employed as indicators of those aspects of the system that have been explored thus far in the testing process. Therefore, a test case generator is used to refute the learned facts. This leads to test cases that are "rare". Such test cases are expected to expose bugs in the program. Exploring anomalous execution patterns have been shown to expose bugs such as data races in multi-threaded programs. For example, anomalous scheduling heuristics are used to expose race conditions and deadlocks in multithreaded program through testing.

Experimental evidence of the efficacy is provided to demonstrate bug finding in accordance with the present principles using a prototype system to build a prototype bug finding infrastructure for, e.g., C programs, targeted towards common bugs such as array overflows and null pointer dereferences.

It should be understood that the elements shown in the FIGS. may be implemented in various forms of hardware, software or combinations thereof. Preferably, these elements are implemented in software on one or more appropriately programmed general-purpose digital computers having a processor and memory and input/output interfaces.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Embodiments can take the form of a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be an electronic, magnetic, optical, electromagnetic, infrared, or semiconductor system (or apparatus or device) or a propagation medium. For example, the medium may include a computer-readable medium such as a semiconductor or solid state memory, magnetic tape, a removable computer diskette, a random access memory (RAM), a read-only memory (ROM), a rigid magnetic disk and an optical disk, etc.

Figure 1:
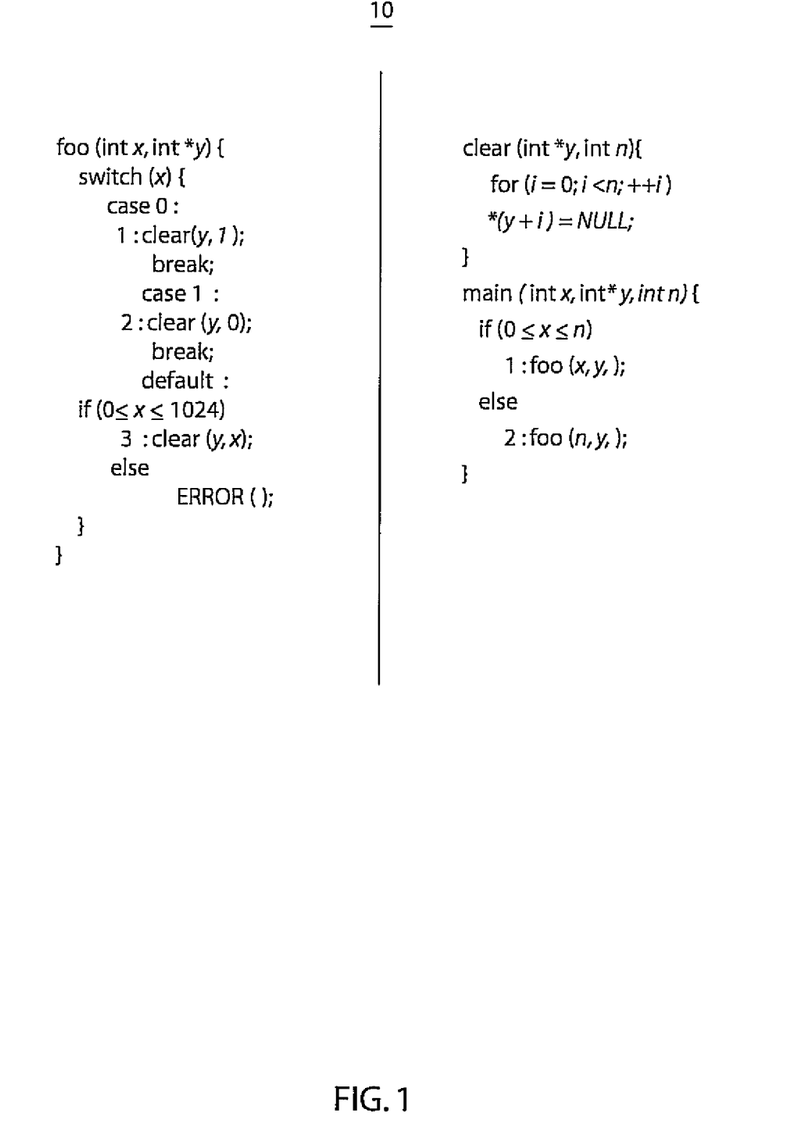
FIG. 1 shows code written in the C programming language for an illustrative example program.

Referring now to the drawings in which like numerals represent the same or similar elements and initially to FIG. 1, an example C program 10 used to illustrate aspects in accordance with the present principles. Given such a program 10, test cases are sought that expose bugs in the program 10. Assume, for example that tests have been run on the instrumented program, and that the output data is available. However, many errors may still remain in the program that need to be exposed by formulating appropriate test cases. As a general rule, exploring paths and input data values that have not been covered by testing is a reliable technique to expose these remaining bugs. In accordance with the present principles, properties are learned from the test data and used to guide the generation of new tests.

Figure 2:
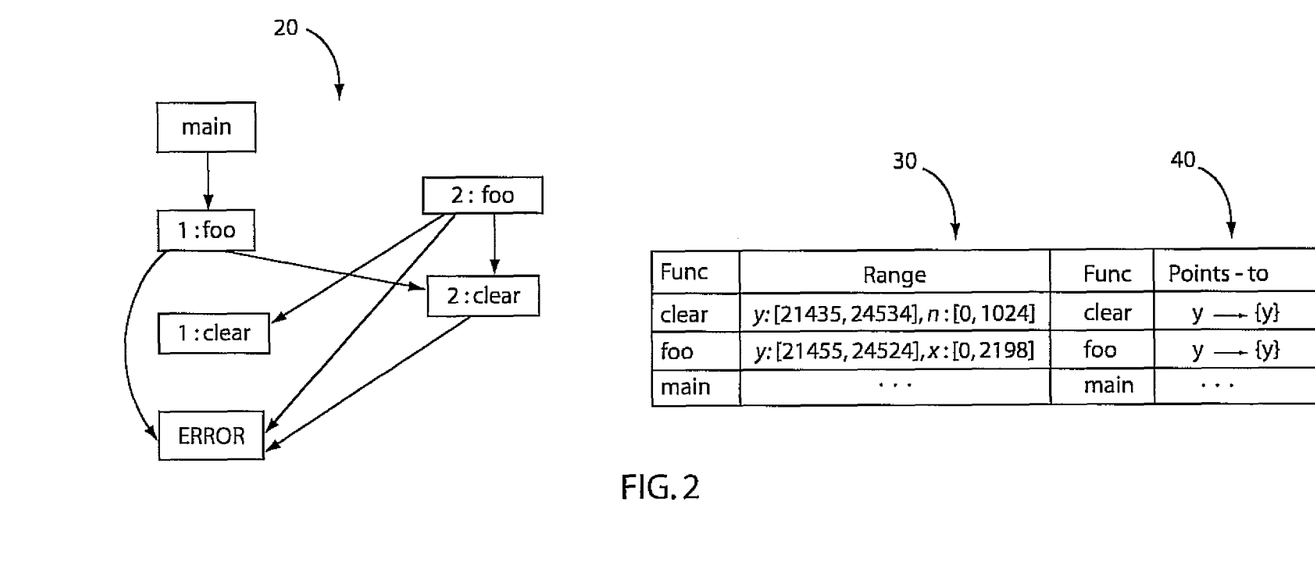
FIG. 2 is a diagram showing examples of hypotheses learned from test output data including automata describing function call sequences, a table for function parameter ranges and an alias table for function parameters.

Referring to FIG. 2 with continued reference to FIG. 1, a graph 20 shows examples of hypotheses learned from test output data in the form of automata describing function sequences. A first table 30 shows ranges of values for function parameters, and a second table 40 shows an alias set for the function parameters. These represent some of the possible properties of the test output that may be inferred automatically and used in the generation of test cases. Such properties can be captured by learning methods with different levels of sophistication. Properties of interest may include the sequence of function calls and returns, the ranges of function parameters at the entry to a function or the points-to relationships between chosen points in a heap at different points in the program. Note that traditional notions of coverage such as line coverage or branch coverage are also properties of the test data that may be useful.

To capture some unexplored behavior of the program, a test generator may be employed to infer test cases that refute the properties inferred on the test data gathered thus far. Such tests could exercise new function call sequences that are not accepted by the call sequence automata, visit specified program points with parameters that lie outside the inferred ranges or with different pointer alias sets. In one approach, we use abstraction and static analysis to generate such test cases. The use of abstraction makes test case generation tractable, while static reasoning makes it more reliable than informal approaches.

By running the tests thus generated, we seek to explore paths and input data values in the program that have previously been unexplored. In this regard, the focus on particular aspects of the program execution ensures that the generated test cases are directed towards the specific types of bugs that are of interest.

Table 1 lists some aspects of programs that may be relevant to different types of programs and bugs. Note that the hypotheses listed therein also happen to be commonly sought after invariants or static properties when the program is statically analyzed for verification.

TABLE 1

Useful hypotheses based on type of program and bug.

| Array Overflow | Pointer Validity | Race Conditions |
| --- | --- | --- |
| Function Call Sequence | Function Call Sequence | Lock Acquisition |
| Variable Ranges | Null Pointer Parameters | Sequence |
| Inequality Invariants | Pointer Aliases | Shared Variable |

TABLE 1-continued

Useful hypotheses based on type of program and bug.

| Array Overflow | Pointer Validity | Race Conditions |
|---|---|---|
| Pointer Aliases | Shape Graphs | Access Sequence |
| ... | ... | Thread Context Switch Pattern |
| | | Pointer Aliases |
| | | ... |

Returning to the example, we may use learning from the test data to infer new test cases. For example, from FIG. 2, we may use each learning hypothesis to infer different types of test cases. For instance, the function call graph suggests many unexplored call sequences including the sequence: main→1: foo→1: clear, that calls the function "foo" from main, followed by a call to the function "clear" from foo.

From the range data, we may choose to run test cases wherein the function "main" is called with a pointer "y" that is "NULL". Similarly, by observing the aliasing data, we may wish to explore situations where the pointer argument "y", that is input to main, points to one of the variables "x, n". Note that in all these cases, our exploration is guided towards producing situations that have not been previously encountered in the testing process.

Figure 3:
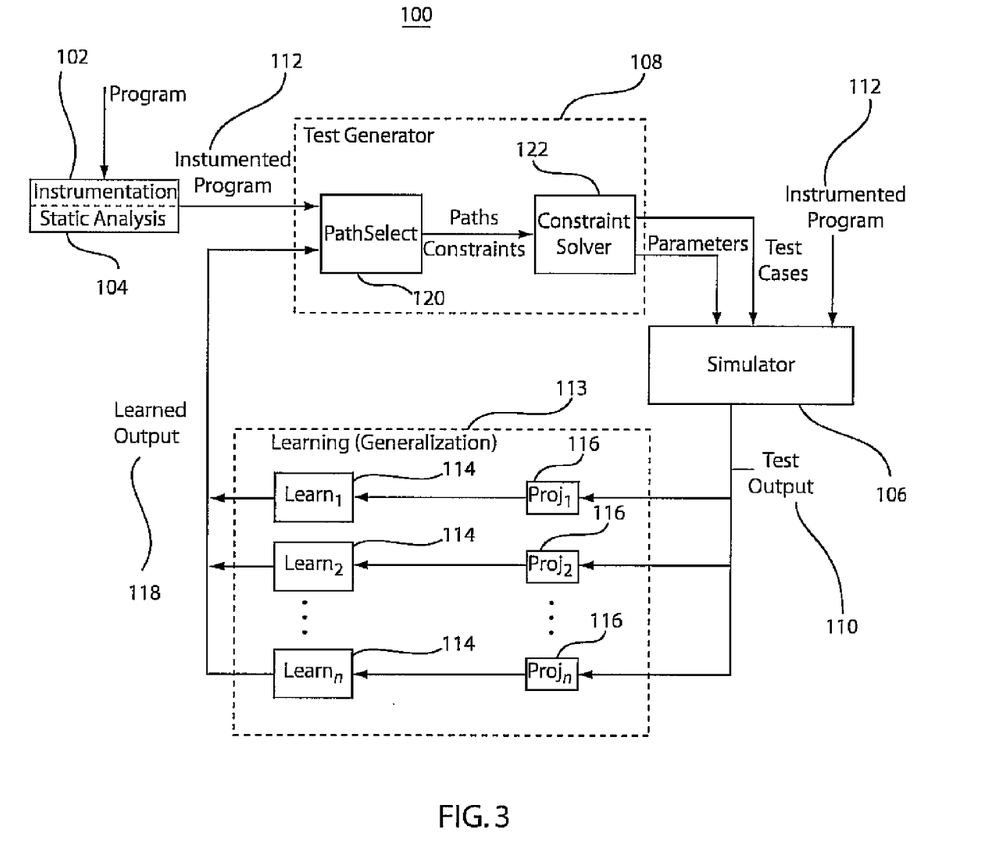
FIG. 3 is a block/flow diagram showing a system/method for analyzing a computer program in accordance with the present principles.

Referring to FIG. 3, a block diagram illustratively shows an analysis framework 100 in accordance with one embodiment. Framework 100 includes two types of instrumentation 102. These include: (a) Monitor statements and assertions, which are added to the input program corresponding to common programming errors such as buffer overflows, invalid pointer accesses and race conditions. For properties such as array overflows, instrumentation is added to track the allocated extents of pointers. (b) Trace instrumentation is used to collect data that are used as inputs to different learning algorithms. For example, learning function call sequences need to print messages corresponding to function calls and returns. Such instrumentation is a standard aspect of most static and dynamic analysis tools. The instrumentation used enables formulation of different types of checks uniformly in terms of reachability of a specific point in the code.

Instrumentation may be facilitated by tools such as, CIL (C Intermediate Language (CIL) which is commercially available open source and a popular tool-suite for writing C language analysis tools), SOOT (SOOT is the front end to CIL for the Java™ language, and is a commercially available and open toolkit), EDG™ (a commercial toolsuite by the Edison Design Group, Inc.), which are known in the art, and F-Soft front end (F-Soft is a NEC Laboratories America, Inc. toolkit).

Static Analysis/Analyzer 104: After instrumentation 102, we perform various static analyses 104 to simplify the analysis and focus a search on the potential bugs that are obtained as alarms raised by the static analyzer 104. By employing a sequence of static analyses, one building upon the other, it is hoped to find as simple a proof for the correctness of properties. Common static analyses that may be employed include range analysis, constant propagation, abstract interpretation on numerical domains such as the polyhedral domain and the octagon domain. These analyses are preferably carried out in a lightweight mode, permitting the focus to be on bug finding.

Apart from the advantage of proving properties that do not require further scrutiny in the framework 100, static analysis 102 removes instrumentation corresponding to properties that are proved correct. We repeatedly simplify the model and apply property-based slicing to further simplify the model post static analysis. For properties like variable ranges and likely invariants, the results of a static analysis can provide hints on variable values and paths that may lead us to a bug. This information can be beneficially used in later stages of the analysis described here.

A simulator 106 executes an instrumented input program using the test cases generated by a test generator 108 to generate test output data 110. In some cases, an instrumented source code 112 can be compiled and executed along with a test harness and test input data provided by the test generator 108. Exercising test cases does not, in general, need a simulator 106. Frequently, however, the entire source code is not available for execution. Common causes include incompletely specified execution environments, missing code or even parts of the system that we do not wish to use in the testing process. The simulator 106 may use default actions to deal with such situations. Missing initial values for global variables or missing inputs may be generated randomly. Missing function calls can be ignored or the side effects modeled with random or deterministic updates as specified by the user.

The simulator 106 enables control of certain aspects of the execution such as scheduling in the case of multi-threaded programs and the timing in case of real time systems through the test case generation process. As a result, the simulator 106 may need further inputs from the test generator 108 or the user to properly execute a program. The simulator 106 output 110 at the end of each iteration is joined to the earlier output data pool to be fed into a learning system 113.

One or more learning methods 114 may be employed and combined to produce hypotheses about varying aspects of the program's execution. Each such learning involves a generalization of each of the data pools into learning output 118 in some predefined form.

For each learning module 114, a corresponding projection 116 simply isolates parts of the test data relevant to that learning method/module 114. The actual learning used is a process of generalization from the input data. Formally, the output of the learning module 114 inductively learns a classifier $\pi_j$: Traces $\mapsto$ [0, 1] that classifies each test output trace as one that is "similar" to a test case that is already encountered or otherwise.

The hypotheses employed here are facts about the output of the program seen so far. For example, if a function call to function $f$ has always preceded the call to function g in the data so far, the learner hypothesizes that this is a property of the system. Similarly, if a variable x takes values in the range [10,100], the learner induces this from the data and presents it as a hypothesis. Given a hypothesis, we can construct a classifier that evaluates a fresh output trace of the program against the hypothesis. The goal of such an evaluation is to quantify whether or not the trace in question satisfies the hypothesis.

There are two requirements for the learning system:
1) Robust: Traces already encountered should be classified as such. Lack of robustness leads to repeated test cases.
2) Structural: The output of the learning should be correlated with the program text in a way that can be used naturally in the test generation (108). In other words, the result of the learning should lead to a tractable test case generation method.

Test generation by test generator 108 includes two basic components. A path selection block 120 selects paths along with constraints to contradict the learning output 118. A constraint solver 122 reasons about feasibility of the selected paths and generates test cases to exercise the feasible paths. In general, it is not enough to provide just the inputs to the simulator. We also provide "parameters" to control the length of the execution, to control the simulation time, to choose random values when encountering non-deterministic choices in the program, etc.

Path selection 120 traverses the program paths in a control flow graph (CFG) representation of the program. The basic idea behind path selection is to use the output from the learning modules to select paths from the CFG along with constraints on the variables at different nodes that contradict the hypotheses $\pi_j$ given by at least one of the learning methods 114 employed.

The constraints here are used to enforce that the hypothesis provided to the learner are contradicted. For example, suppose the learner hypothesizes that the value of a variable "v" is in the range [10,40], the constraints v<10 or v>40 are used by the path selector in addition to the chosen path.

Given a call sequence automaton, the path selector 120 selects a set of paths through the program with a sequence of function calls that does not belong to the language recognized by the automaton. Similarly, given variable ranges at program points, the path selector 120 outputs program paths along with linear inequality constraints that can cause points of interest to be visited with variable values that lie outside the specified range. The output of this module 120 is a set of program paths along with some constraints on the program states at specific points in the path. In the case of real-time or multi-threaded program, the path selection 120 may also generate additional timing or scheduling constraints based on the generalizations of timing or scheduling data.

The constraint solver 122 reasons about the feasibility of the program paths and the constraints generated by the path selection module 120. For each feasible path, it selects input values that may cause the path to be exercised when the program is simulated. It also generates additional data to guide the simulator 106, such as scheduling constraints in the case of real-time or concurrent systems.

The test generator module 108 results in new test cases that are designed to cause the program to exercise behaviors that contradict the current hypotheses produced by the learning system 112.

Learning: As mentioned earlier, the learning used in framework 100 is employed to classify a path through the CFG as being similar to a test case already encountered or otherwise.

Learning Function Call Sequences. Function call sequences are a key determinant to a program's behavior. This is reflected in the popularity of coverage metrics based on the function call graph, or in the use of context-sensitive analysis in programs. Furthermore, many common causes of bugs including application program interface (API) usage errors are directly dependent on function call sequences encountered during execution.

A simple scheme for "learning" call sequences may be to store them in a data structure such as a trie. However, this form of learning does not work well in practice since the space of function call sequences is large even for moderately sized programs. Storing such sequences may result in representations that are too unwieldy for use in our test generation framework. Secondly, storing the call sequences does not involve any generalization beyond what has already been encountered. Such a generalization is useful in ensuring that each iteration of the process explores something that is significantly different from what has been encountered previously.

The automata learning approach may include Ngram-based automata learning. A technique for learning automata generalizing the function call sequences encountered while running test cases is presented. Assume a formal language made up of an alphabet of instrumented events including function calls, returns and other events of interest to the user. Each such event is assumed to be a letter in the alphabet, and a sequence of letters is a word. From the test output, we may derive many sequences of such events. We shall call each such sequence a trace. One aspect to present approach is its use of NGRAMS to learn automata. An NGRAM is a word including a sequence of N>0 letters. The assumption used in NGRAM learning is that at any point, only the previous n−1 letters in a sentence have any effect on the probabilities for the next letter. For example, "ABCD" and "EF" are 4-grams and 2-grams, respectively.

NGRAMS are commonly used in natural language modeling and understanding. This concept is employed to represent automata characterizing sub-sequences of a trace. Each state of the automaton is an NGRAM of length n∈[1, N], denoting the occurrence of all the events denoted by the letters that make up the NGRAM. Automata edges connect these NGRAMS to represent a set of traces.

Figure 4:
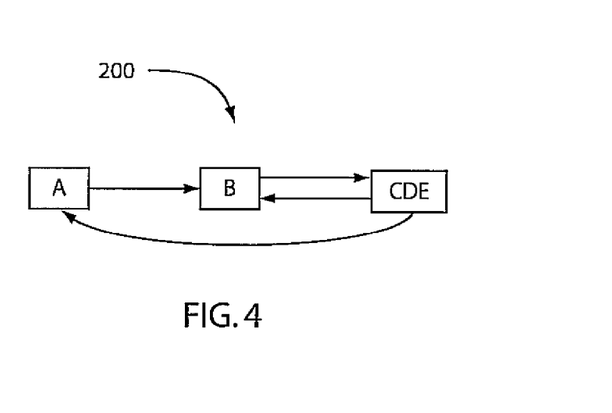
FIG. 4 is an example of an automaton using Ngrams.

Referring to FIG. 4, an example of an automaton 200 is illustratively shown. The NGRAMS in this automaton 200 are "A", "B" and "CDE". By controlling the length of NGRAMS, we can control how much a learned automaton could generalize from the observed function call sequences.

Figure 5:
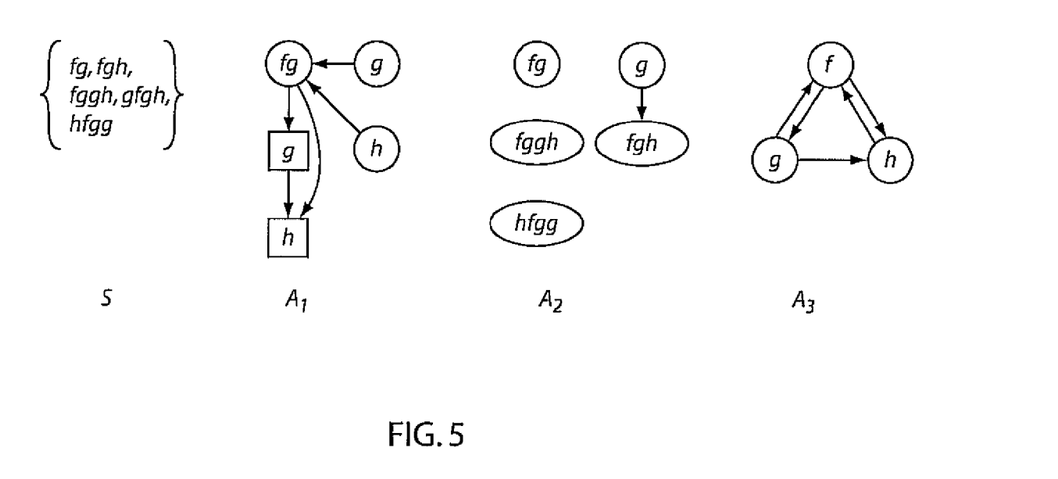
FIG. 5 is a diagram showing an illustrative set of sequences and different automata based on NGRAMS.

Referring to FIG. 5, representations of the same set of sequences S using NGRAMS of different lengths are shown. A set of sequences S and different automata ($A_1$, $A_2$, $A_3$) based on NGRAMS representing the set are illustratively shown. Circled states are initial and all states are final. Note that an automaton using longer NGRAMS is less likely to accept sequences that are not part of an input sequence than an automaton made up of shorter NGRAMS. The present embodiments automatically extract a series of varied-length NGRAMS from the observed traces. The technique identifies NGRAMS from the trace data. In the following, methods used to automatically extract NGRAMS and construct automata are described.

NGRAM Extraction: NGRAM extraction is similar to the classic sequential pattern mining algorithms. The present technique starts by constructing NGRAMS of length n=1. We construct NGRAMS of longer length by combining smaller NGRAMS under certain conditions. A threshold α is introduced to filter out non-frequent function combinations. Let f(s) denote the frequency of occurrence of an NGRAM s. We combine two NGRAMS $s_1, s_2$ to produce a larger NGRAM, s only if $f(s) \geq \alpha \min(f(s_1), f(s_2))$. Informally, the inequality implies that the longer sequence s can replace at least an α fraction of the occurrences of $s_1$ and $s_2$. As α→0, smaller NGRAMS always combine and thus, the longest NGRAM becomes the whole trace itself. Conversely, as α→1, smaller NGRAMS seldom combine to form longer NGRAMS, i.e., n=1. Thus, by controlling α, we can control the length of the extracted NGRAMS. A dynamic programming technique based on the replacement policy above can generate a set of frequently occurring NGRAMS $C_k$ for a given length k.

Automata Construction: The above method extracts a series of frequently occurring NGRAM sets $C_k$ with varying length k. These NGRAMS are the basis for subsequent automata construction. Before constructing the automata, we sort the NGRAMS with the same length (e.g., the NGRAMS in the same set $C_k$) according to their frequency. The present method iterates through all the traces in the test data and compresses each trace into a sequence of NGRAMS. This compression attempts to replace sub-sequences of length k occurring in the trace by an NGRAM $c_k \in C_k$, if one exists.

The attempt for replacement starts with the longest possible sub-sequences first using the following priority rules:

Rule 1: Replace longer sub-sequences with NGRAMS, if possible.

Rule 2: For NGRAMS in the same set, choose the more frequent one first.

After compressing each trace, the automaton construction adds an edge between two NGRAMS m, n if there is a compressed trace where n immediately follows m.

Let S be a finite set of strings and A be the automaton learned by the NGRAM learning methods described above. It follows that $L(A) \supseteq S$. Furthermore, for $\alpha=1$, $L(A)=S$. As mentioned earlier, generalization is one of the requirements of the learning methods. The generalization ability of present invention has many aspects: NGRAMS occurring contiguously "often enough" in traces are replaced by self-loops. Secondly, states with multiple in and out edges in the automata usually introduce the opportunity of generalization. In FIG. 5, automata $A_2$ is obtained for $\alpha \rightarrow 1$, note that this represents S exactly. However, automata $A_3$ obtained for a 0 includes many more sequences that do not belong to the set S. Following the Minimum Description Length (MDL) principle, we keep the automata's representation as small as possible to restrict the arbitrariness of the generalization.

Constraint Learning: Constraint learning focuses on learning likely invariant relationships among the variables of the program for the purposes of test generation. Such relationships could include variable ranges, linear equalities, inequalities, pointer aliasing, shape graphs for data structures, among the many possibilities. Learning interrelationships among program variables from test data is a well-studied and popular approach to verification. These constraints have been used in the context of inferring likely invariants. Depending on the form of the relationships sought, the learning may range from simple recording of values to complex statistical techniques like neural nets representing complex functions. However, instead of using such relationships as likely invariants, we negate these relationships and attempt to generate test cases that satisfy the negation.

Test Generation: The test generator (108, FIG. 3) utilizes the output of the learning system (113, FIG. 3) to generate test cases. Such test cases seek to refute the properties learned. This is, in general, a difficult problem. A formal approach is intractable, whereas an approach that is informal may be unreliable for our purposes. Secondly, the test case being sought may not exist in the first place. For example, test case generation will fail if the learning output is an actual invariant of the program. We employ static test case generation using path-based reasoning, but also based on best-efforts: exploration is restricted to a subset of paths on an abstraction of the program, while our reasoning may be restricted to tractable theories such as linear arithmetic.

In general, the design of a test generator (108) depends on the type of learning used for its input. Different types of learning use different abstractions and reasoning engines. For simplicity, we describe test case generation for function call sequence automata and linear constraints learned from test output; however, other abstractions and reasoning engines may be employed.

Call Sequences Test Generation: Let A be an automaton describing all the function call/return sequences encountered thus far, G be the CFG representing the program, and F be its function call graph.

Path Selection: We perform an iterated exploration of the paths in F while testing each path for membership in L(A). Let it be a path in F that does not belong to L(A). In practice, we may choose many such paths up to a given cutoff. Furthermore, the function call graph may include dummy call sites as place holders for instrumented points in the program.

Given a path $\pi$, a path segment denotes a pair (f, g) including a function entry f and either a call site to g inside the body of f or a return point from function $f$. For each path segment (f,g) in $\pi$, we perform a Depth First Search (DFS) of the control flow graph (CFG) representation of the program to find all simple (loop free) paths lending from f to g, while visiting no other functions. Each such path may visit a loop head at most once. The simple path is expanded by unrolling each loop a fixed number of times, and abstracting the loop updates rewriting each update to be non-deterministic. Given such a path, we compute path summary $(\gamma, U)$, consisting of a guard $\gamma$ and an update U, wherein $\gamma$ denotes the conditions on the program variables at f for the execution to reach g. Similarly, $U(x_o, x)$ is a relation between the variable values x at g and those at f denoted $x_o$, that over-approximates the possible effects of the chosen path from f to g. The path is feasible if $\gamma$ is satisfiable.

Path Predicate Computation: A precondition of an assertion $\phi$ with respect to an update U is given by pre($\phi$, U): $\{x | \exists y, U(x,y) \wedge \phi[y]\}$. Similarly, the composition of two updates $U_1$, $U_2$ is denoted by $U_1 \circ U_2$: $\{(x,z) | \exists y, U_1(x,y) \wedge U_2 (y,z)\}$. Path summaries $(\gamma_1, U_1)$ and $(\gamma_2, U_2)$ may be composed as: $(\gamma_1, U_1) \circ (\gamma_2, U_2) = (\gamma_1 \wedge pre(\gamma_2, U_1), U_1 \circ U_2)$.

The composition and precondition operations together form the basic primitives that are repeatedly used to compute path summaries. The precise algorithm for path generation mirrors the standard approaches that are used in theorem proving and in static analysis communities for computing predicates and summaries along paths (e.g., the backward substitution method).

Each path segment (f, g) leads to a number of path summaries that summarize the effect of different CFG paths leading from f to g. We denote these by the set $\sigma_{f,g}$. Given two sets of summaries $\sigma_1$, $\sigma_2$, their composition $\sigma_{12}$: $\sigma_1 \circ \sigma_2$ is given by computing pairwise composition of summaries in $\sigma_1$ and $\sigma_2$: $\sigma_1 \circ \sigma_2$: $\{(\gamma_1, U_1) \circ (\gamma_2, U_2) | (\gamma_i, U_i) \in \sigma_i, i=1,2\}$.

Given a call graph path $\pi$: $(f_1,g_1), (f_2,g_2) \ldots (f_n, g_n)$, let $\pi_k$ denote the prefix $(f_i,g_i) \ldots (f_k,g_k)$, for $1 \leq k \leq n$. We compute a set of path summaries $\sigma(\pi)$ by iterated composition as follows: $\sigma(\pi_0) = \sigma_{f_1,g_1}$, $\sigma(\pi_{m+1}) = \sigma(\pi_m) \circ \sigma_{f_{m+1},g_{m+1}}$ Test Case Generation: Let $\sigma(\pi)$ denote the set of path summaries for a path $\pi$. The path is feasible if at least one summary is feasible. Given $\sigma$, the test cases can be obtained by generating witnesses to each satisfiable $\gamma$ that guards a summary $(\gamma, U) \in \sigma$. The specifics of test case generation depends on the actual representation of $\gamma$. For example, if $\gamma$ were represented in linear arithmetic, an LP (linear program) or an ILP (integer linear program) solver can be used to generate satisfiable instances, which may in turn be used as test cases after rounding.

Figure 6:
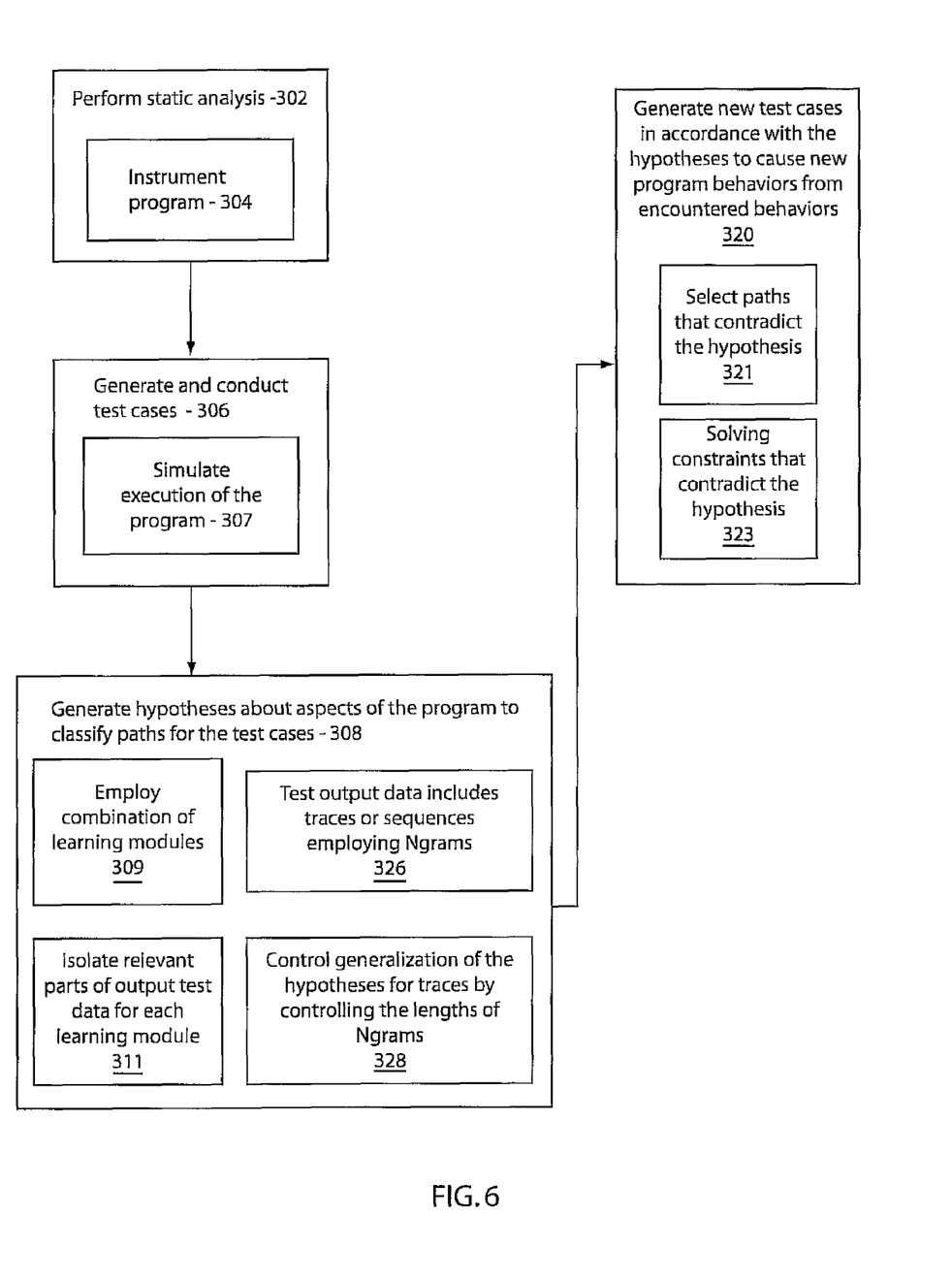
FIG. 6 is a block/flow diagram showing a system/method for analyzing a computer program in accordance with the present principles.

Referring to FIG. 6, a system/method for analyzing a computer program includes performing a static analysis on a program to determine property correctness in block 302. This may include instrumenting the program to track and check program features in block 304. In block 306, test cases are generated and conducted to provide test output data. This may include simulating execution of the program using the test cases to provide test output data in block 307.

In block 308, hypotheses about aspects of execution of the program are produced to classify paths for test cases to determine whether the test cases have been encountered or otherwise. This may include providing a combination of learning modules to generate the hypotheses in block 309. In block 311, relevant parts of the output test data are isolated for each learning module.

In block 320, in accordance with the hypothesis, new test cases are generated to cause the program to exercise behavior which is outside of the encountered test cases. This may include selecting paths in the program that contradict the hypotheses in block 321. In block 323, selecting paths includes solving constraints in the program that contradict the hypotheses. The constraint solving determines feasibility of the selected paths and generates test cases to exercise feasible paths.

In block 326, the test output data includes traces or sequences and the traces are preferably represented by employing NGRAMS. In block 328, controlling generalization of the hypotheses for traces is provided by controlling a length of the NGRAMS.

Experiments: Our prototype implementation uses a front end infrastructure and static analyses built for a verification platform and an automata sequence learner. The front end constructs a CFG and performs many front end simplifications such as slicing, addition of property checks, constant folding and includes a suite of static analysis including pointer analyses, and many numerical domain analyses. It also performs memory modeling, and provides instrumentation utilities including a simulator generator.

Learning. We have implemented the function call sequence learning described herein. Generalization is controlled by setting an appropriate value of α. We choose α=0.8 to limit the generalization while at the same time avoiding long NGRAMS.

The test generator was implemented using linear arithmetic built using a Parma polyhedral library and the LP solver GLPK. The front end provides a linear abstraction of the CFG. We employ two path generators, at the call graph level and the CFG level. These are randomized with a limit on the number of paths explored. An exhaustive path generation is infeasible for large programs.

Test generation is performed using a LP solver to solve the satisfiability problem of a guard expressed as a polyhedron. By setting many objectives with random coefficients, we are able to generate different satisfiability witnesses that also serve as test cases. The test generator maintains a record of tests generated in the previous iterations of the procedure, and guarantees different test cases in each iteration, where possible. The abstraction has many limitations, chief among which are the handling of array contents and recursive heap data structures such as linked lists. As a result, the generated test cases may sometimes fail to exercise the paths we choose. The inability to handle array contents and heap data structures result in many inputs to the program for which we do not obtain initial values. We set such inputs to random values. Similarly, in cases where the LP solver yields a floating point solution, our simulator runs such tests many times while randomly choosing to round up or down. In some cases, the true predicate is returned by the test generator.

TABLE 2

Results for the experimental example. All timings are in seconds.

| Program | | | Random | | | Present Embodiments | | | | |
|---|---|---|---|---|---|---|---|---|---|---|
| Name | LOC | #Err | Random | #Steps | Time | LearnTime | #TGenTime | #Tests | #Steps | #Err |
| f1 | 356 | 2 | | 6M | 5.5 | 5.2 s | 4 | 11 | 2K | 2 |
| f6 | 362 | 2 | | 8M | 5.8 | 6 | 4 | 1 | 2K | 2 |
| f7 | 60 | 4 | | 4M | 5.2 | 7 | 4 | 3 | 6K | 5(*) |
| f9 | 159 | 3 | | 11M | 7.2 | 78 | 5 | 48 | 4M | 8(*) |
| f10 | 2281 | 8 | | 6M | 10 | 12 | 672 | 28 | 23K | 6(—) |
| f11 | 1910 | 4 | | 11M | 10 | 11 | 61 | 7 | 32K | 6(*) |
| f13 | 1868 | 4 | | 3M | 6.5 | 8 | 86 | 4 | 10K | 2(—) |
| Total: 13 functions | 8211 | 53 | | 200M | 99.4 | 203 | 904 | 126 | 6M | 57 |

This may be due to the coarseness of our abstraction caused by the presence of non linear conditions, conditions involving variables updated inside loops, or simply the lack of conditions in the code (straight-line code). In such cases, we resort to random simulation to jump start the test case generation process.

Table 2 shows the results of running our tool in accordance with the present embodiments on a mobile application with 13 interface functions. The code was instrumented at array accesses and pointer indirections to detect array overflows. The simulator reads in the test case and executes each test 100 times, choosing random values for uninitialized variables, and adding random noise to round floating point numbers resulting from the LP solver. Each simulation was allowed to run for a maximum of 104 steps. The tests produced by our framework are compared against a random simulator which produces 107 randomly generated test cases for each function.

Our test case generator derived 126 test cases in all by running 4 iterations of learning and test case generation for each function. These test cases resulted in 57 witnesses as opposed to 53 witnesses found by the random simulator. For 3 of the functions, the test case generator repeatedly produced the assertion true; our framework, in effect, performed random simulation for these three cases.

The present principles, related to computer software development and, in particular, for improved software testing of single and multi-threaded software, incorporate a dynamic software testing framework on top of a powerful static analyzer and software model checker. This enables increased coverage and confidence of software programs that could not be formally proved or for which no witness trace was generated using other static techniques. The addition of a multi-threaded dynamic software testing framework on top of static analysis techniques provides better coverage of interesting scenarios, as well as a more focused dynamic analysis for multi-threaded software compared to current state-of-the-art dynamic software testing methods. By utilizing a machine learning based system and method during the test generation phase, further generalization is achieved of traces that have been witnessed so far, thus permitting focus on under-explored paths and state-space regions depending on the feature data provided to the learning method. The feature data here corresponds to the observed run-time traces, in particular they can be thought of as projections of generated traces. The learner can be utilized in a variety of ways depending on the status of the analysis. In the early stages of analysis, it can be used to improve test generation for coverage metrics or bug finding, while in later stages it can be used as heuristics to generate hypothetical program-dependent properties to be checked by a more formal analysis approach such as model checking. There has also been work on probabilistic learning methods to discover bugs in multi-threaded code.

Compared to the current state-of-the-art software testing methods, the present invention offers faster operation (e.g. fewer test cases) and higher quality results (e.g. better testing coverage etc.) due to a more focused analysis after static analysis. In comparison to static software analysis tools, the present invention offers a way to scale the analysis to find deep and intricate potentially multi-threaded software bugs. Furthermore, by using machine learning to learn program behavior, the present approach provides heuristics to automatically mine for hypothetical program-dependent properties that can be utilized by a software model checker.

Having described preferred embodiments of a system and method for software testing using machine learning (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for analyzing a computer program, comprising:

Performing, using at least one processor, a static analysis on a program to determine property correctness;

generating and conducting test cases to provide test output data;

applying one or more learning methods for producing hypotheses about aspects of execution of the program to classify paths for test cases to determine whether the test cases have been encountered or otherwise, wherein each learning is a generalization from input data and the output of the learning methods inductively classifies if each test output trace is similar to a prior test case, and wherein path selection traverses program paths in a control flow graph (CFG) representation of the program and to select paths from the CFG along with constraints on the variables at different nodes that contradict a hypothesis given by one learning method;

performing an iterated exploration of one or more paths while testing each path for membership;

for each path segment (f,g) in a path, performing a depth first search of the CFG representation of the program to find all loop free paths lending from f to g while visiting no other functions;

determining a path summary consisting of a guard y and an update U and marking the path as feasible if the guard is feasible;

determining a set of path summaries $\sigma(\pi)$ by iterated composition as follows $$\sigma(\pi_0) = \sigma_{f1,g1}, \sigma(\pi_{m+1}) = \sigma(\pi_m) \circ \sigma_{fm+1,gm+1};$$

wherein $\pi$ represents a call graph path; and in accordance with the hypothesis, generating new test cases to cause the program to exercise behavior which is outside of the encountered test cases.

2. The method as recited in claim 1, wherein performing a static analysis includes instrumenting the program to track and check program features.

3. The method as recited in claim 1, wherein generating new test cases includes selecting paths in the program that contradict the hypotheses.

4. The method as recited in claim 3, wherein selecting paths includes selecting constraints in the program that contradict the hypotheses.

5. The method as recited in claim 3, further comprising constraint solving selected paths to determine feasibility of the selected paths and generate test cases to exercise feasible paths.

6. The method as recited in claim 1, wherein generating and conducting test cases to provide test output data includes simulating the program using the test cases to provide test output data.

7. The method as recited in claim 1, wherein producing hypotheses about aspects of execution of the program includes providing a combination of learning modules to generate the hypotheses.

8. The method as recited in claim 7, further comprising isolating parts of the output test data relevant to each learning module.

9. The method as recited in claim 7, wherein the test output data includes traces and further comprising employing NGRAMS to represent traces.

10. The method as recited in claim 9, further comprising controlling generalization of the hypotheses for traces by controlling a length of the NGRAMS.

11. A non-transitory computer readable storage device comprising a computer readable program, wherein the computer readable program when executed on a computer causes the computer to perform the steps of:

performing a static analysis on a program to determine property correctness;

generating and conducting test cases to provide test output data;

applying one or more learning methods for producing hypotheses about aspects of execution of the program to classify paths for test cases to determine whether the test cases have been encountered or otherwise, wherein each learning is a generalization from input data and the output of the learning methods inductively classifies if each test output trace is similar to a prior test case, and wherein path selection traverses program paths in a control flow graph (CFG) representation of the program and to select paths from the CFG along with constraints on the variables at different nodes that contradict a hypothesis given by one learning method;

performing an iterated exploration of one or more paths while testing each path for membership;

for each path segment (f,g) in a path, performing a depth first search of the CFG representation of the program to find all loop free paths lending from f to g while visiting no other functions;

determining a path summary consisting of a guard y and an update U and marking the path as feasible if the guard is feasible;

determining a set of path summaries $\sigma(\pi)$ by iterated composition as follows $$\sigma(\pi_0) = \sigma_{f1,g1}, \sigma(\pi_{m+1}) = \sigma(\pi_m) \circ \sigma_{fm+1,gm+1};$$

wherein π represents a call graph path; and in accordance with the hypothesis, generating new test cases to cause the program to exercise behavior which is outside of the encountered test cases.

12. A system for analyzing a computer program, comprising:

at least one processor;

a static analysis code executed by a processor and configured to instrument and analyze a program to determine property correctness;

a test generator to generate test cases on an instrumented version of the program and to provide test output data;

a learning system configured to produce hypotheses about aspects of execution of the program to classify paths for the test cases to determine whether the test cases have been encountered or otherwise, wherein each learning is a generalization from input data and the output of the learning methods inductively classifies if each test output trace is similar to a prior test case, and wherein path selection traverses program paths in a control flow graph (CFG) representation of the program and to select paths from the CFG along with constraints on the variables at different nodes that contradict a hypothesis given by one learning method, wherein the learning system performs an iterated exploration of one or more paths while testing each path for membership, and for each path segment (f,g) in a path, performs a depth first search of the CFG representation of the program to find all loop free paths lending from f to g while visiting no other functions; determines a path summary consisting of a guard y and an update U and marking the path as feasible if the guard is feasible; and determines a set of path summaries σ(π) by iterated composition as follows $$\sigma(\pi_0)=\sigma_{f1,g1}, \sigma(\pi_{m+1})=\sigma(\pi_m)\circ\sigma_{fm+1,gm+1};$$

wherein π represents a call graph path; and a feedback loop coupled from the learning system to the test generator to provide hypotheses to the test generator to generate new test cases to cause the program to exercise behavior which outside of the encountered test cases.

13. The system as recited in claim 12, wherein the test generator includes a path selector configured to selecting paths in the program that contradict the hypotheses.

14. The system as recited in claim 13, further comprising a constraint solver configured to resolve constraints for selected paths in the program that contradict the hypotheses.

15. The system as recited in claim 13, wherein the constraint solver determines feasibility of the selected paths and generates test cases to exercise feasible paths.

16. The system as recited in claim 12, further comprising a simulator to execute at least portions of the program to provide test output data using the test cases.

17. The system as recited in claim 12, wherein the learning system includes a combination of learning modules to generate the hypotheses.

18. The system as recited in claim 17, further comprising a projection for each learning module configured to isolate parts of the output test data relevant to each respective learning module.

19. The system as recited in claim 17, wherein the test output data includes traces represented by NGRAMS.

20. The system as recited in claim 19, wherein the NGRAMS include a controlled length such that by controlling the length a generalization of the hypotheses for traces is controlled.

* * * * *